Sept. 10, 1968   H. B. CHRISTENSON   3,400,481
NYLON FISHING ROD WINDING
Filed May 23, 1966

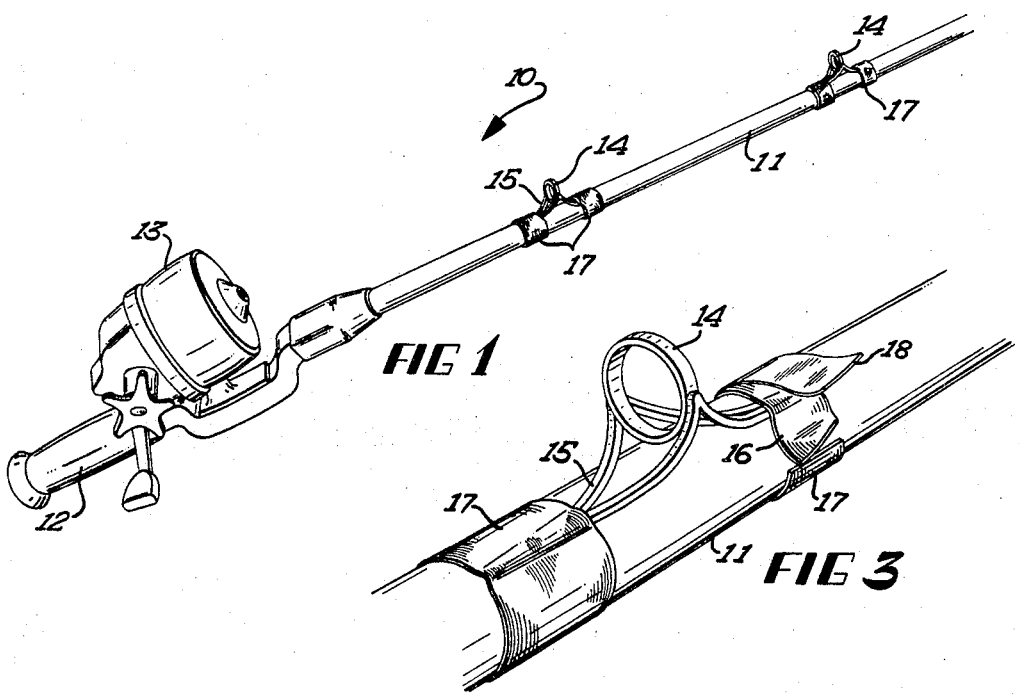

| IMPREGNATE NYLON CLOTH WITH POLYMERIZABLE RESIN |
| --- |
| CUT TREATED CLOTH TO PROPER SIZE |
| ADVANCE IMPREGNATED CLOTH TO "B" STAGE |
| POSITION GUIDE ON ROD AND WRAP GUIDE FEET WITH THE TREATED CLOTH STRIPS THE DESIRED NUMBER OF TURNS |
| WRAP OVER TREATED CLOTH WITH CELLOPHANE |
| HEAT TO COMPLETE POLYMERIZATION OF TREATED CLOTH |

FIG 2

INVENTOR.
HARLAN B. CHRISTENSON
BY Meyers & Peterson
ATTORNEYS

United States Patent Office 3,400,481
Patented Sept. 10, 1968

3,400,481
NYLON FISHING ROD WINDING
Harlan B. Christenson, Spirit Lake, Iowa, assignor to Berkley & Company, Inc., Spirit Lake, Iowa, a corporation of Iowa
Filed May 23, 1966, Ser. No. 552,295
7 Claims. (Cl. 43—24)

The present invention relates generally to an improved apparatus and technique for securing line guides to the periphery of a fishing rod, and more particularly to such a technique wherein the mounting feet of a line guide are bound onto the surface of the rod by means of a tape which includes heat shrinkable fibers disposed generally axially of the tape, and generally transversely of the rod.

In the mounting of the line guides onto the surface of a fishing rod, it is generally perferable that the guide be held tautly, as also that the means retaining the guide on the rod function so as not to adversely affect the flexing characteristics of the rod shaft. It has been traditional to mount the line guides by means of a thread woven helically about the periphery of the rod, this structure normally being substantially free of adversely affecting the flexing characteristics of the rod shaft. There are two disadvantages to this method of winding, the first being the relatively high cost of performing the operation, the second being the tendency of the winding thread to progressively unravel, and thereby permitting the foot of the eyelet to become disengaged from its captive relationship between the winding and the outer surface of the rod shaft.

In accordance with the present invention, a nylon cloth impregnated with a polymerizable resin, such as for example, a phenolic resin or the like, is cured to the "B" stage, and thereafter cut to the desired size. The guide is placed in position on the rod, and the cloth or tape is then wound around the foot of the guide for a reasonable number of turns, such as, from about two to about five turns, and is thereafter tightly bound onto the surface of the rod. Thereafter, the assembly is passed through a heating zone or treating zone wherein the temperature is increased to a point sufficient to substantially cure the polymerizable resin, and simultaneously shrink the nylon fibers in-situ. By this technique, the cloth tightly adheres to the surface of the rod, and thereby retains the individual feet of the guide firmly in place. The technique is rapid, efficient, and since the cloth is provided with substantially only longitudinally fibers, a minimum of transverse fibers being employed, there is virtually no adverse affect on the flexing characteristics of the rod shaft, due to the introduction of the tape winding on the outer surface thereof.

Therefore, it is an object of the present invention to provide an improved technique for binding line guides onto the surface of a fishing rod shaft, the winding being accomplished in an expeditious and efficient manner.

It is yet a further object of the present invention to provide an improved technique for mounting a line guide onto the surface of a fishing rod shaft, the technique employing a tape which may be wound in superimposed fashion over the surface of the rod, and thereby holding captive the line guide feet.

Other and further objects of the present invention will become apparent to those skilled in the art upon a study of the following specification, appended claims, and accompanying drawing wherein:

FIGURE 1 is a perspective view of a fishing rod having line guides secured thereto in accordance with the technique of the present invention;

FIGURE 2 is a flow diagram of the steps carried out in mounting a line guide onto a fishing rod in accordance with the technique of the present invention; and FIGURE 3 is a detail perspective view on a slightly enlarged scale of one of the line guides shown on the rod in FIGURE 1, and illustrating one of the windings in its normal form, and the other winding in partially disassembled form.

In accordance with the preferred modification of the present invention, particularly as shown in FIGURES 1 and 3 of the drawing, the fishing rod assembly generally designated 10 includes a flexible rod or shaft member 11 having a handle portion 12 secured to the butt end thereof. A reel 13 is mounted on the handle portion, as illustrated in FIGURE 1. A line guide having a central or eyelet portion 14 together with a pair of laterally extending legs 15—15 is secured to the shaft of the rod by the nylon cloth member shown at 16, and particularly in its assembled or bonding configuration as shown at 17. A leader or extension portion 18, such as shown in FIGURE 3 may be secured to the end of the individual tape portion 16, particularly for the purpose of wrapping, banding, or otherwise tautly securing the tape onto the rod shaft. This leader portion 18 will, of course, be removed following the exposure of the assembly to a heat treating zone wherein the polymerizable resin impregnated into the nylon cloth is cured, and in which operation the nylon cloth is shrunk onto the outer surface of the rod shaft.

With particular attention being directed to FIGURE 2 of the drawings, it will be observed that the material utilized is preferably a nylon cloth which is impregnated with a polymerizable resin, such as, for example, a phenolic resin or the like. It has been found, however, that epoxies or other thermosetting resins may be successfully utilized, the phenolics and epoxies generally being preferred. The nylon is employed since it is a material which will shrink upon exposure to a relatively high temperature, such as, for example, a temperature such as would be encountered in the polymerization step for a phenolic or epoxy resin. Generally, a temperature of between about 175° C. and 200° C. is utilized, particularly for such nylons as Nylon 66 or Nylon 610. Nylons of this type are generally commercially available. Certain acrylic fibers such as polyvinyl chloride fibers are dimensionally unstable at elevated temperatures, and may be used as a shrink fiber. A suitable phenol-formaldehyde or phenolic resin which may be employed in conjunction with nylon fibers forming a cloth is that certain material identified by the code name G.E. 13122, and available from the General Electric Co. of Pittsfield, Mass.

This impregnated cloth is then exposed to a temperature in the range of about 120° C. for a period of five minutes, this being adequate to advance the impregnated cloth to the "B" stage of cure. Thereafter, the treated cloth may be cut to proper size for winding. If desired, the two steps just described may be reversed in their order, the operator being able to take into account the shrinkage which may occur in the material when advancing the cure to the "B" stage. The guide is then positioned on the surface of the rod, with the feet extending laterally of the eyelet, and arranged in a position wherein the axis of the rod shaft lies substantially parallel to the axis of the individual feet 15—15 extending outwardly from the eyelet 14. The treated cloth, previously advanced to the "B" stage, is then wrapped about the surface of the feet in a taut fashion, with the individual windings being superimposed, one upon the other. The edge portion of the tape which initially contacts the rod may be adhesively bonded or otherwise treated so as to render the winding operation more expeditious. Generally, with the type of cloth as previously indicated being used, a number of windings ranging from between about two and about five will normally be found to be adequate. The wrapped cloth or tape is then tightly bonded to the surface of the rod shaft by means of an external winding of a heat shrinkable material such as, for example, cellophane or the like. Of course, other heat shrinkable materials may be employed as a wrap over the previously wrapped tape. The entire assembly is then heated to a temperature of about 150° C. for a period of about ten minutes, this being adequate to complete the cure of the phenolic resin, and also being adequate to provide for a shinkage of about 10% in the nylon cloth. This will produce a tightly bonded adherent winding about the periphery of the rod, with the resin in the cloth being sufficiently mobile to move into contact with the legs 15 of the line guide, and thereby serving to provide an adhesive bond between the rod shaft and the legs 15. In other words, a fillet or wedge of the polymerizable resin is formed along the edge surfaces of the individual legs 15, this serving to enhance or establish a bond between the rod shaft and the legs.

As indicated in the drawings, the width of the cloth winding is sufficiently long so as to cover the entire length of the individual legs 15, it being recalled that the individual windings are preferably superimposed, one upon the other. The appearance of the finished winding is substantially indistinguishable from a thread wound winding. It will be further appreciated that the winding material may be printed, dyed, or otherwise decorated in order to present the proper aesthetic appearance when complete. Furthermore, the individual resin may be impregnated with a dye in order to enhance the color. In lieu of a cloth having few, if any, transverse fibers, a cloth having a reasonable number of transverse fibers of substantially smaller diameter than the longitudinal fibers may be used.

Generally speaking, the rod shaft 11 is fabricated from a group of fiberglass fibers arranged in substantially longitudinal disposition within the rod shaft, the fibers being impregnated with a resin selected from the group consisting of phenol-formaldehyde resins and polyester resins. Polyester resins used for rod manufacture are normally selected from the terephthalic-sebacic acid-ethylene glycol combinations. Polyesters of this type are, of course, commercially available. The materials are therefore compatible with the tape and the material with which the tape is impregnated.

It will be appreciated by those skilled in the art that the specific examples provided herein are for purposes of illustration only, and are not to be construed as a limitation upon the scope to which this invention is otherwise reasonably entitled.

What is claimed is:

1. In combination, a fishing rod comprising a flexible shaft and a plurality of line guides arranged in spaced apart relationship along the axial extent thereof, each of said line guides having an eyelet and spaced apart feet disposed on opposite sides of said eyelet and extending laterally therefrom for securing said eyelet to the surface of said shaft; means for retaining said feet along the surface of said flexible shaft, said retaining means comprising:

(a) a tape consisting essentially of a plurality of sub-substantially longitudinally disposed heat shrinkable fibers impregnated with a heat curable resin and being wound tautly in a plurality of turns about the periphery of said flexible shaft, with said fibers being disposed generally transversely to the axis of said shaft, each turn of said tape being generally superimposed upon the turn thereunder, with at least one turn confining one of the feet being retained adjacent the outer periphery of said shaft, said heat curable resin being substantially cured, and said fibers having been thermally treated to shrink onto the said shaft.

2. The method of mounting a line guide having an eyelet and a pair of spaced apart mounting feet disposed on opposite sides of said eyelet and extending laterally therefrom onto the surface of a flexible fishing rod shaft which comprises wrapping a length of a tape consisting essentially of a plurality of longitudinally disposed heat shrinkable fibers impregnated with a heat curable resin about the periphery of said rod and over the said mounting feet, placing said tape within a heat treating zone to expose said resin and fiber to a sufficiently high temperature for a sufficiently long period of time to substantially cure said resin and shrink said fibers tautly about said shaft.

3. The method as set forth in claim 2 being practicularly characterized in that said heat shrinkable fibers consist essentially of nylon.

4. The method as set forth in claim 3 being particularly characterized in that said heat shrinkable fibers are Nylon 66.

5. The method as set forth in claim 2 being particularly characterized in that said heat curable resin is selected from the group consisting of phenol-formaldehyde and epoxy resins.

6. The method as set forth in claim 2 being particularly characterized in that said heat shrinkable fibers are Nylon 66, said heat curable resin is a phenol-formaldehyde resin, and said treating zone is held at a temperature of about 150° C.

7. The method as set forth in claim 6 being particularly characterized in that said heat treatment is carried out for a period of ten minutes.

References Cited

UNITED STATES PATENTS

| | | | |
|---|---|---|---|
| 2,577,466 | 12/1951 | Jones | 264—342 |
| 2,619,714 | 12/1952 | Dornaus | 43—24 X |
| 2,775,054 | 12/1956 | Shinbane | 43—24 |
| 2,778,141 | 1/1957 | Haas | 43—24 |
| 3,171,229 | 3/1965 | Shobert | 43—24 |
| 3,296,047 | 1/1967 | Parr | 156—86 |

WARNER H. CAMP, *Primary Examiner.*